(12) United States Patent
Nikitczuk

(10) Patent No.: US 10,849,727 B2
(45) Date of Patent: Dec. 1, 2020

(54) ELECTRIC TOOTHBRUSH

(71) Applicant: Church & Dwight, Co., Inc., Princeton, NJ (US)

(72) Inventor: Jason Nikitczuk, Hillsborough, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 773 days.

(21) Appl. No.: 14/593,755

(22) Filed: Jan. 9, 2015

(65) Prior Publication Data

US 2016/0199165 A1 Jul. 14, 2016

(51) Int. Cl.
*A61C 17/22* (2006.01)
*A61C 17/34* (2006.01)

(52) U.S. Cl.
CPC .......... *A61C 17/222* (2013.01); *A61C 17/349* (2013.01); *A61C 17/3445* (2013.01); *A61C 17/3427* (2013.01)

(58) Field of Classification Search
CPC ......... A46B 13/02; A61C 17/34; A61C 17/22; A61C 17/26; A61C 17/3445; A61C 17/349; A61C 17/3427
USPC .................. 15/22.1, 22.2, 22.4, 28
See application file for complete search history.

(56) References Cited

U.S. PATENT DOCUMENTS

| | | | |
|---|---|---|---|
| 2,044,863 A | 6/1936 | Sticht | |
| 2,657,321 A | 10/1953 | Smithson, Jr. | |
| 5,197,498 A * | 3/1993 | Stewart | A61C 15/046 |
| | | | 132/323 |
| 5,226,206 A | 7/1993 | Davidovitz et al. | |
| 5,359,747 A | 11/1994 | Amakasu | |
| 6,178,579 B1 | 6/2001 | Blaustein et al. | |
| 6,360,395 B2 | 3/2002 | Blaustein et al. | |
| 6,725,490 B2 | 4/2004 | Blaustein et al. | |
| 6,895,625 B2 | 5/2005 | Lev et al. | |
| 7,225,494 B2 * | 6/2007 | Chan | A61C 17/34 |
| | | | 15/22.1 |
| 8,185,991 B2 * | 5/2012 | Kressner | A46B 9/04 |
| | | | 15/22.1 |
| 8,590,091 B2 * | 11/2013 | Dickie | A61C 17/349 |
| | | | 15/22.1 |
| 8,607,394 B1 | 12/2013 | Liao | |
| 8,677,542 B1 | 3/2014 | Whillock | |
| 8,713,738 B2 | 5/2014 | Gatzemeyer et al. | |
| 8,739,344 B2 | 6/2014 | Sorrentino | |
| 2002/0174498 A1 | 11/2002 | Li | |

(Continued)

*Primary Examiner* — Monica S Carter
*Assistant Examiner* — Abbie E Quann
(74) *Attorney, Agent, or Firm* — Church & Dwight Co., Inc.

(57) ABSTRACT

An electric toothbrush with a replaceable brush head section is disclosed. The electric toothbrush includes a handle including a motor therein and a brush head section. The toothbrush has a longitudinal axis extending through the handle to the far end of the brush head. The brush head section includes a translation head and an oscillation head, each of which has a bristle support member, one of which will rotate and oscillate and the other of which will not rotate or oscillate, but will reciprocate along, or substantially parallel to, the longitudinal, axis. The translation head is adapted so that its motion will induce a different motion in the bristle head of the oscillation head. The invention results in reduced assembly costs.

20 Claims, 10 Drawing Sheets

(56) References Cited

U.S. PATENT DOCUMENTS

2003/0084527 A1   5/2003  Brown et al.
2005/0102776 A1   5/2005  Mathur
2014/0143962 A1   5/2014  Mok et al.

* cited by examiner

OSCILLATION + TRANSLATION PLATE → FIRST SUB-ASSEMBLY

FIRST SUB-ASSEMBLY + FIRST OF HEAD SHELL → SECOND SUB-ASSEMBLY

RETURN MECHANISM + TRANSLATION HEAD TO SECOND SUB-ASSEMBLY → THIRD SUB-ASSEMBLY

ALTERNATIVE A. SECURING OSCILLATION HEAD TO FIRST SECTION OF HEAD SHELL
FOURTH SUB-ASSEMBLY

THIRD OR FOURTH SUB-ASSEMBLY + SECOND PORTION OF HEAD SHELL →
AT LEAST PARTIALLY ENCLOSED THIRD OR FOURTH SUB-ASSEMBLY

*FIG. 9*

ELECTRIC TOOTHBRUSH

FIELD OF THE INVENTION

The present invention is in an electric toothbrush, and particularly in a multi-brush dual action electric toothbrush, a replaceable brush head section for the electric toothbrush, a translation head for an electric toothbrush and a method of assembly.

BACKGROUND OF THE INVENTION

The electric toothbrush has appeared in the patent literature since at least as early as the 1930s. See U.S. Pat. No. 2,044,863. A discussion of different types of electric toothbrushes can be found in U.S. Patent Publication No. 2003/0084527A1. Early powered toothbrushes were bulky and unnecessarily complex. See U.S. Pat. No. 2,657,321. Over the years, there has been a steady improvement and evolution of the basic electric toothbrush and parts thereof from the handle through, and including, the brush head, its motion and the bristle arrangement, material, size distribution, material pattern, grouping and rigidity of the brush head bristles. The art also shows toothbrushes specifically designed to address special problems. See U.S. Pat. No. 8,677,542.

It is believed that a dual action electric toothbrush may provide a better cleaning and user experience, and more closely mimic, but improve on, a manual toothbrush motion. Complex motion toothbrushes are known in the art. See U.S. Pat. Nos. 6,725,490, 7,225,494, and 8,713,738. Where multiple motion paths are practiced, the drive systems employed in such products have become increasingly complex. See for instance U.S. Pat. No. 8,677,542 and U.S. Patent Publication No. 2014/0143962. These more complicated drive systems lead to increased manufacturing and assembly costs and can contribute to, or in some cases give rise to, durability issues. This is especially true for the multi-head and/or multi-motion type of electric toothbrush.

The thorough and effective cleaning lifespan of the brush or brushing section of any toothbrush, whether hand-powered or electric, is governed by a number of factors and generally can be as short as about 3 months. The effective cleaning lifespan is a function not only of the continued effectiveness of the brush bristles but also of the integrity of the bristle support structure and motion or drive system of the device. Worn bristles diminish the cleaning performance and therefore the brush or brushes must be replaced periodically. Likewise, worn support structures and parts of the drive system need to be replaced since they also can impact performance. Worn parts can result in misalignment causing excessive vibrations leading to wobble during brushing and can negatively impact cleaning performance, the effective cleaning lifespan, and the user experience.

Since the wear from use is associated with the brush head section and attendant parts, and the more complex and expensive components are within the handle section, it is desirable to provide for a brush head section which, if necessary, can be replaced repeatedly. The replacement brush head section must be provided as a unit which can be quickly, easily and correctly replaced by the consumer with a minimum of time, effort and expense. The pricing of a replacement brush head section is also a concern since it must be cost effective; otherwise a consumer may be discouraged from making the initial electric toothbrush purchase. Thus, it is desirable to provide reliable replacement brush parts at a minimum cost and, where possible, improve the effective cleaning lifespan of the brush head section regardless of the market price point of the product.

An important part of any electric toothbrush is its drive system and return system whereby the motor motion is transmitted and adapted to properly actuate the moving parts, especially the bristle supporting sections, in the desired motion pattern or patterns to perform the desired cleaning function. Numerous toothbrush designs and drive systems have been proposed to impart various types of motion to one or more bristle supporting sections.

U.S. Pat. No. 5,226,206 discloses a motorized toothbrush having a brush holder 3 carrying 2 bristle holders 4 mounted for partial rotary movement in opposite directions. The brush holder 3 and the portion of the drive assembly of interest are part of carriage assembly 10. See FIG. 2. The brush holder 3 houses a pair of gears 13 and a fixed U shaped rack member 14 (FIG. 5) or 114 (FIG. 6) in cavity 3a. Rack 14 has a toothed leg and an untoothed leg. When the carrier assembly 10 is reciprocated, it causes the gears 13 to engage the teeth of fixed rack 14 so that bristle holders 4 are rotated while being reciprocated in slots 15a of cover plate 15. Thus the bristle holders undergo reciprocating translation as well as clockwise and counter-clockwise motion. See col. 3, lines 16 to 39.

U.S. Pat. No. 5,359,747 shows a single head electric toothbrush having a case 1 and an attachment 10. The single brush head simultaneously undergoes axial reciprocal motion and a rotary motion. The axial reciprocal motion results because the entire attachment 10 (FIGS. 1-4) is removably attached to the top end of drive shaft but moves together with the reciprocating drive shaft as a single unit. See column 4, lines 3 to 10. An extending bar is mounted inside the attachment such that the bar can slide in the axial direction. The top end of the bar is bent or offset into an "L" shape and provided with a multi-toothed rack which meshes with a multi-tooth pinion 13. According to the disclosure at col. 3 lines 49 to 63, the extending bar 15, which is connected to fixed shaft 9, remains stationary with respect to case 1. The vertical or longitudinal motion of attachment 10, which moves as one body with drive shaft 8, causes pinion 13 to move and its teeth to engage the rack causing the pinion to rotate. Thus, the rack remains stationary relative to the case, but the pinion is in motion. The rotary motion of the pinion is transmitted to the rotary brush member which reciprocally rotates on the attachment. Due to the motion of the attachment, it appears that the rack must have at least six teeth as illustrated in the figures of that patent document.

U.S. Pat. No. 6,895,625 is primarily concerned with a single brush toothbrush which enters into an automatic mode when activated by contact of the brush with the user's teeth. The brush head of the device of the '625 patent is replaceable and has a brush head with first and second housings which house a part of the drive system. The drive system includes a reciprocating drive shaft which acts like a slider crank mechanism and is attached to a yoke of a pinion carrier. The pinion carrier partially houses a pinion which engages a bristle head. A portion of the pinion interacts with a multi-tooth rack. The reciprocating motion of the drive shaft moves the pinion along the rack and causes the bristle head to simultaneously translate and rotate as best shown in FIGS. 3 and 4 of that patent.

U.S. Pat. No. 8,185,991 is directed to a dual action electric toothbrush having two bristle carriers, each of which has a different type of motion, that are mounted on a brush head carrier. In the transmission system a rigid metal rectilinear rod drive rocker is driven by an eccentric means so that the two ends of the drive rocker execute a double cone shaped tumbling or circulatory movement in a plane perpendicular to the device's longitudinal axis. The drive rocker directed to bristle carrier 10 is seated in a longitudinal slot-like cutout of the carrier and is positioned in that area of the carrier facing the handle section. The rear bristle carrier is rotated about an axis which is perpendicular to the longitudinal axis of the device. Carrier 13 is pivoted about axis 19 (which is essentially parallel to the above mentioned axis and perpendicular to the longitudinal axis of the toothbrush) so that bristle carrier 13 pivots laterally as shown in FIG. 2.

A dual action electric toothbrush is also shown in U.S. Pat. No. 8,590,091. The toothbrush therein described has a first bristle block, an adjacently disposed second bristle block, and a drive shaft with an offset end which engages a third slot of the base and can rotate through 360° causing the first bristle block to move. Rotation of the drive shaft results in a motion of the first block which in turn results in a different type of motion of the second block. The rotation of the drive shaft does not directly cause motion of the second bristle block, but indirectly causes a side-to-side rocking motion of block 54. See col. 7, lines 12 to 42.

U.S. Pat. No. 8,607,394 pertains to a manual toothbrush which employs in its transmission system a multi-toothed rack and multi-toothed pinion. FIG. 1 shows a single brush head and FIGS. 2 to 5 pertain to the embodiment shown in FIG. 1. FIGS. 3 to 5 show a rack having at an outwardly extending bent distal end thereof a series of 4 or more teeth for engagement with a multi-toothed gear depicted as having 10 or more teeth. The gear is attached to a rotating head on which the bristles are mounted. See FIG. 3. The reciprocating motion of the rack enables the teeth to engage the teeth of the gear resulting in the rotation of the brush head. FIGS. 6 to 8 show an alternate embodiment wherein a group of fixed bristles is mounted on a top panel. The fixed bristles move linearly by means of a sliding shaft as shown in FIGS. 2 to 5. Other examples of use of a multi-tooth rack and a multi-toothed pinion gear in manual or electric toothbrushes are shown in U.S. Pat. Nos. 6,453,499, 5,120,225, 5,435,034, 5,383,242, and 5,186,627.

U.S. Patent Publication No. 2005/0102776 shows numerous embodiments of a tooth brush head for a toothbrush having a head, a handle at an opposite end thereof, an angled neck there-between, and a longitudinal axis. That portion of the transmission system in the neck and head areas includes a number of swivel arms and attachment pins. See Paragraph Nos. [0047] to [0049]. As shown in FIG. 1B, a third swivel arm has an offset section attached by a pin to an outer edge of the bristle support structure disk. Movement of the swivel arm induces a partial rotation of the support structure about an axis approximately normal to the longitudinal axis. Another embodiment is shown in FIGS. 5A and 5B and differs from that of FIGS. 1 to 4E in that they show a swivel arm attached to a rack having a plurality of teeth which communicate with the teeth of the gear so that the gear will rotate and counter-rotate. The gear is attached to a threaded hollow cylinder and coupled to a solid threaded cylinder at an opposite end. The rotation of the gear results not only in the rotational movement of the bristles, but also in their vertical movement. See Paragraph No. [0056]. Other embodiments shown in the publication use rack and gear arrangements to provide different motion paths.

U.S. Patent Publication No. 2002/0174498 relates to an electric single brush toothbrush having a handle section attached to a section. A motor and gearing results in a first connecting rod having a rotary motion. See Paragraph No. [0011]. A block head is formed of a blockhead tube and a bristle supporting round head. As shown, a tube houses a transmission head and a second connecting rod. That connecting rod extends from a transmission head and has a crooked shaft at its end. The round head attached to the bristles includes a groove which receives the crooked shaft. As shown in FIG. 5, the groove faces the handle section when the round head is at rest. According to Paragraph No. [0012], in operation, the gearing will cause the first connecting rod to have rotary motion. Through the transmission head and the longitudinal rack, the second connecting rod is caused to rotate. The crank shafts in the groove causes the round head to rotate/counter-rotate and clean the teeth.

U.S. Pat. No. 8,739,344 shows an approach to address the problem of wear of parts other than bristles resulting from vibration employing vibration isolating zones in the head and reducing vibrations transmitted to the handle.

U.S. Patent Publication No. 2014/0165312 shows a refill head for a powered toothbrush.

SUMMARY OF THE INVENTION

The present invention is in a personal hygiene device, and more particularly, in a dual action or multi-motion electric toothbrush for cleaning one's teeth and/or gums with performance characteristics at least comparable to those of currently commercially available products, but with a replaceable brush head section having fewer parts and reduced manufacturing costs.

In one aspect, the invention is in a multi-brush head dual action electric toothbrush having a handle which houses a motor and, optionally, a portion of the drive system. The device has a brush head section adapted for a simple, quick, and easy engagement to the handle. The toothbrush of the invention can be used with conventional or special toothpaste and can have varied arrangements and sizes of bristle support members and for bristles making up the bristle tufts. The bristles and/or bristle tufts may be of various materials and shapes. Preferably, the heights of the bristles in the different bristle tufts are about the same, but the heights may be different and may be arranged in pre-selected patterns of varied dimensions, geometries and materials. The brush head section or neck section may be generally or substantially planar or angularly offset with respect to the handle.

The electric toothbrush of the invention has a longitudinal axis generally extending the length of the device from the handle through the brush head section. In another aspect of the invention, the brush head section is replaceable. Preferably, the brush head section of the invention is formed of a shell portion, a translation head, an oscillation head, and a return mechanism.

The shell portion of the brush head section of the invention can be formed of an upper head and lower head shell section, each made of a plastic or polymeric material. Each of the upper and lower head shell sections is constructed for a fitting engagement with the other head shell section.

In another aspect of the invention, the shell portion of the brush head is fashioned so that it receives, and/or supports, and/or positions and/or aligns the translation head. The translation head may be in the form of a plate or rod and is adapted and positioned such that it will experience rectilinear motion along, or substantially parallel to, the longitudinal axis of the toothbrush. Preferably, a first bristle support member is attached to, or formed as a part of, the translation head and, in operation, will have a reciprocating motion as does the translation head. The translation head has a section, such as an arm or protrusion, having a contoured upper end fashioned for engagement to induce a different motion pattern, such as rotary or oscillatory motion, of a second bristle support pad or bristle structure. Preferably, the translation head is of a plastic or polymeric material and is of a unitary construction such as a single molded piece or plastic part molding. The brush head section includes an oscillation head which supports a second bristle support structure. The oscillation head has a bottom piece attached to, or formed as part of, the oscillation head, and is positioned concentric to the second bristle support member. The oscillation head can interact with the translation head arm or protrusion by means of one or more peripheral structural features such as one or more cavities positioned, dimensioned, and shaped to engage with the contoured upper end of the arm or protrusion, preferably in an upward forward quadrant of the oscillation head, so that the reciprocating motion of the translation head will impart an oscillating motion to the oscillation head and the bristle support member thereon. The brush head section and/or handle house(s) or share(s) a return mechanism whereby the translation head reciprocates as discussed above.

In operation, the bristle head support most distant from the handle will have a rotary oscillation within a predetermined angular range while the brushes and bristle head support on the translation head, and closest to the handle, will not rotate or oscillate but will undergo reciprocating rectilinear motion along, or at least substantially parallel to, the longitudinal axis of the device. The oscillating bristle support will counter-rotate within the predetermined angular range with the return stroke of the translation head. The brush head section is essentially stationary in relation to the handle. That is to say that the brush head section will not undergo any significant motion or displacement along the longitudinal axis relative to the handle.

In another aspect of the invention, the drive system of the invention has fewer moving parts and dispenses with the multiple pin-swivel arm arrangement in the brush head section, thus not only reducing wear and wobble problems, but also resulting in a reduction of manufacturing and assembly costs.

In another aspect of the invention, there is provided a method of assembly of the brush head section and electric toothbrush of the invention.

Therefore, it is an object of the invention to provide a low cost yet effective electric toothbrush.

It is another object of the invention to provide an electric toothbrush having reduced manufacturing costs associated with the product.

It is another object of the invention to provide a replaceable brush head section for an electric toothbrush of the invention.

It is another object of the invention to provide an improved drive system in an electric toothbrush.

It is yet another object of the invention to provide a compact arrangement for a replaceable brush head section of an electric toothbrush whereby different types of brush head motion are exhibited in operation.

It is still another object of the invention to provide an improved device for simultaneously causing rectilinear and oscillating motion to different bristle head support structures of the brush head section.

It is another object of the invention to provide an electric toothbrush which, over its lifespan of use, experiences reduced wobble in operation.

It is another object of the invention to provide a reliable cost effective multi-action dual head design having an ease of manufacture.

It is yet another object of the invention to provide an electric toothbrush having a brush head with a reduced number of parts in the brush head assembly resulting in lower manufacturing costs and the potential for automated assembly, fewer moving parts, and reduced durability issues.

It is still another object of the invention to provide a method of assembly for an electric toothbrush.

It is yet another object of the invention to provide a method of assembly which may be completely or partially automated.

The various features of novelty which characterize the invention are pointed out with particularity in the claims annexed to and forming a part of this specification. For a better understanding of the invention, its operating advantages and specific objectives obtained by its use, reference should be made to the accompanying drawings and descriptive matter in which there is illustrated and described a preferred embodiment of the invention.

BRIEF DESCRIPTION OF THE FIGURES

FIG. 9 summarizes a method of assembly.

DETAILED DESCRIPTION OF THE INVENTION

Figure 1:
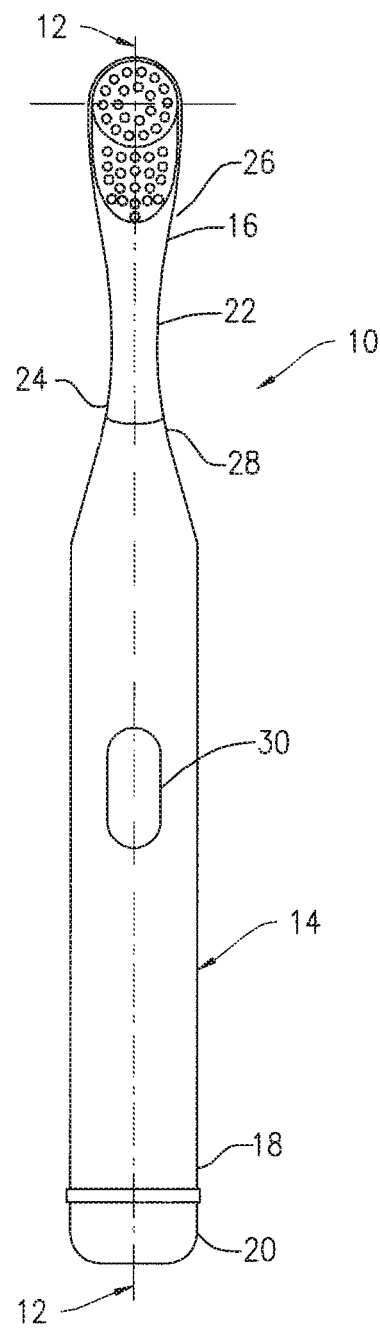
FIG. 1 is a front planar view of an electric tooth brush of the invention.

The present invention in a preferred form is in an electric toothbrush, a replaceable brush head section for the electric tooth brush, a drive system for inducing motion in the brush head section of the electric tooth brush and a method of assembly. More particularly, the invention is in a dual head-dual action electric toothbrush wherein different bristle heads of the toothbrush undergo different types of motion and motion paths to provide an enhanced performance.

Throughout the following description of the one or more embodiments of the invention, like reference numerals will indicate the same element throughout. Where a range of values is provided in connection with the following description, it should be understood that each intervening value, to the tenth of the unit of the lower limit unless the context clearly dictates otherwise, between the upper and lower limit of that range and any other stated or intervening value in that stated range, is included therein. Smaller ranges are also included. The upper and lower limits of these smaller ranges are also included therein, subject to any specifically excluded limit in the stated range. As used herein, the term "forward" is intended to refer to the direction extending away from the handle of the toothbrush towards the brush head while the term "rearward" refers to a direction from the head section going towards the handle end of the device. The term "longitudinal" refers to a lengthwise aspect of an element or object as observed in a planar view of the element or object. A "longitudinal axis" is an axis that corresponds with, or is at least substantially coincident with, the longitudinal direction of the element or object. Where a head or neck is angled with respect to each other or the handle, each of their respective longitudinal axes may not lie in the same plane but the axes do extend in the same general longitudinal direction in a top planar view.

Subject to the foregoing and unless otherwise indicated, the technical and scientific terms, expressions and abbreviations used herein have the same meaning as commonly understood by one of ordinary skill in the art in the field of the invention.

Figure 2:
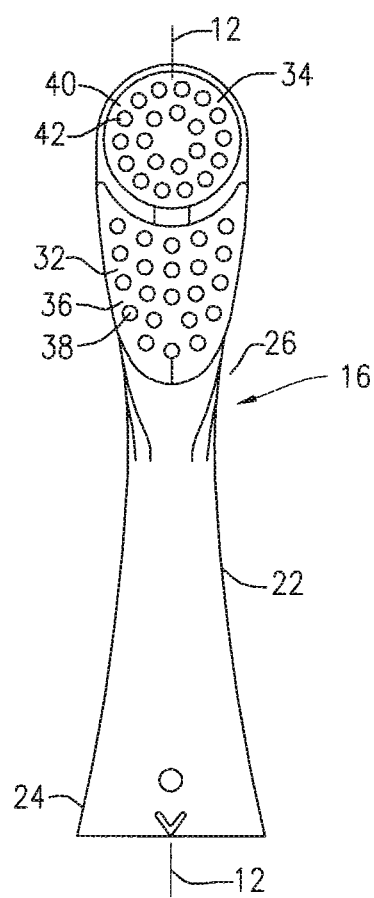
FIG. 2 is an enlarged front planar view of a brush head section of the invention of FIG. 1.

Referring to FIG. 1, an electric toothbrush 10 of the invention is shown in a front planar view. Electric toothbrush 10 has an elongated body and a longitudinal axis 12 which generally extends through a handle 14 and brush head section 16. The handle 14 and brush head section 16 are at least substantially co-linear along longitudinal axis 12 as shown in FIG. 1 or may be angularly off-set, as shown in FIGS. 1 and 2 of U.S. Pat. No. 6,360,395, to enable easier access to the back of the mouth. The handle 14 houses a power source such as a motor and/or battery. Handle 14 at its rear or lower section has a snap on or hinged snap on cover 20 to allow access to a battery compartment of a battery powered toothbrush. Brush head section 16 is formed of a neck section 22 which has a rearward section 24 and a forward section 26. The rearward section 24 is adapted for a quick and simple attachment to handle 14 at a forward end 28 thereof such as by inserting the brush head section into the handle and turning it to snap-lock with the handle. The handle 14 has an activation/deactivation switch 30 operatively connected to the motor and is preferably of an ergonomic design including depressions and grip areas (not shown) as is known in the art for ease of use and comfort.

As more clearly illustrated in FIG. 2, in a preferred embodiment, brush head 16 is a multi-brush head section having a first tufted bristle pad support or lower head 32 and a second tufted bristle pad support or upper head 34. In a preferred embodiment, the first bristle pad support 32 has a partial ellipse geometry and the second bristle support pad 34 has a rounded or circular configuration. The first bristle pad 32 is formed of a bristle support 36 and a plurality of bristles or bristle tufts 38. The second bristle pad 34 is likewise formed of a bristle support 40 and a plurality of bristles or bristle tufts 42.

As discussed above, the arrangement of the bristles, bristle hardness, geometry, and three dimensional orientation can be varied. For instance, the bristles can be positioned in various patterns on their respective pads and grouped or mixed according to hardness, thickness and/or length. The bristles may be oriented in a vertical configuration normal to the respective pad surface or angularly off-set from the vertical relative to their respective pad.

Figure 3:
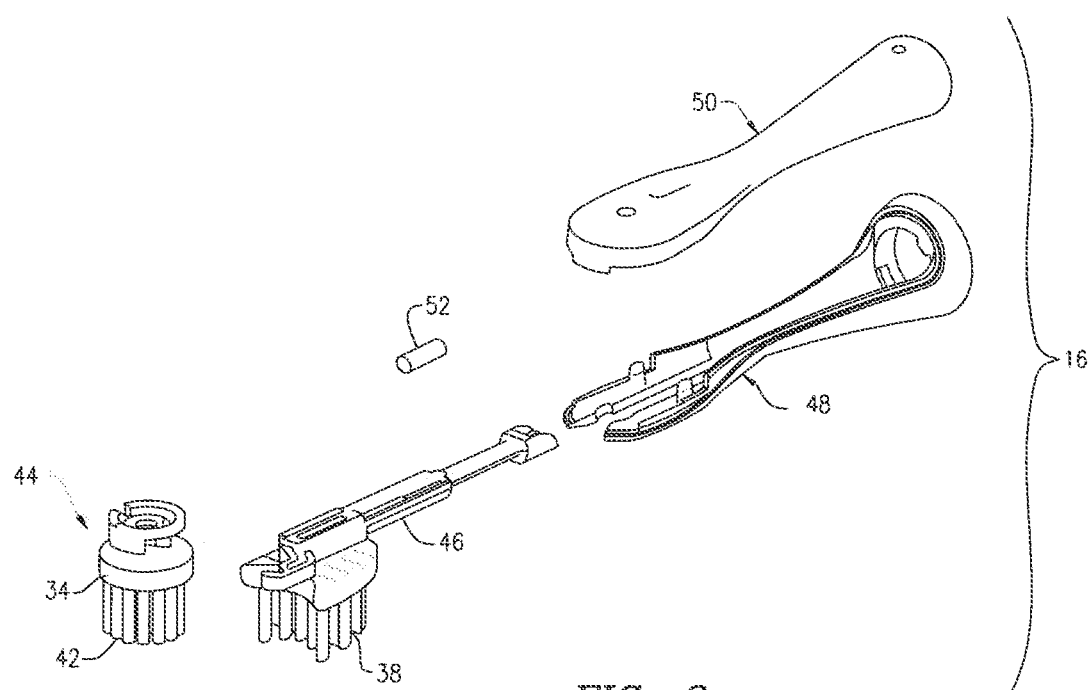
FIG. 3 is an exploded view of a brush head section of the invention in perspective.

FIG. 3 shows in perspective an exploded partial assembly view of the brush head section 16. Brush head section 16 is composed of a number of easily assembled component parts. As shown, brush head section 16 is formed of an oscillation head 44, a translation plate or head 46, a lower head shell 48, an upper head shell 50, and a return mechanism 52.

A. The Oscillation Head

Figure 4A:
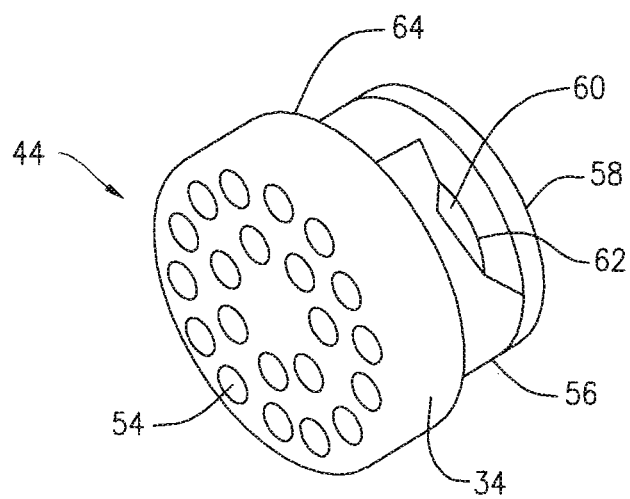
FIG. 4(a) shows a perspective view of an un-tufted oscillation head of the invention.
Figure 4B:
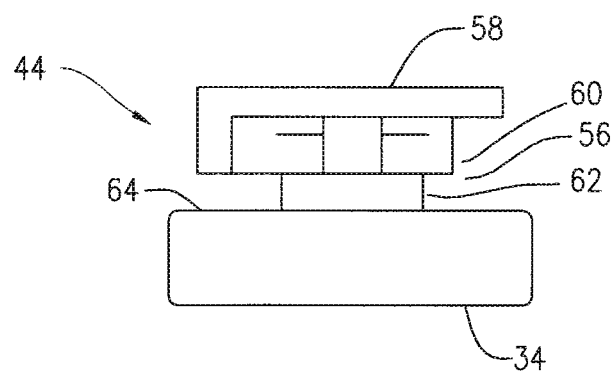
FIG. 4(b) shows an end view (inverted) of the oscillation head of FIG. 4(a)

Referring to FIGS. 4(a) and (b) the oscillation head 44 includes a bristle plate 34 (shown un-tufted) with openings 54 for location and attachment of bristle tufts shown in FIG. 2. The tufts/bristles are located and secured in position by conventional means known in the art. Bristle plate 34 is generally circular in configuration ("upper bristle plate") and has an underside 64. Oscillation head 44 has a mid-section 56 and a bottom ring member 58. Mid-section 56 has a contoured member 60 and a mid-section neck or axle 62 which extends to the bottom ring member 58. Preferably, oscillation head 44 is of a one piece construction and is of a commercially available acetal copolymer.

Figure 5A:
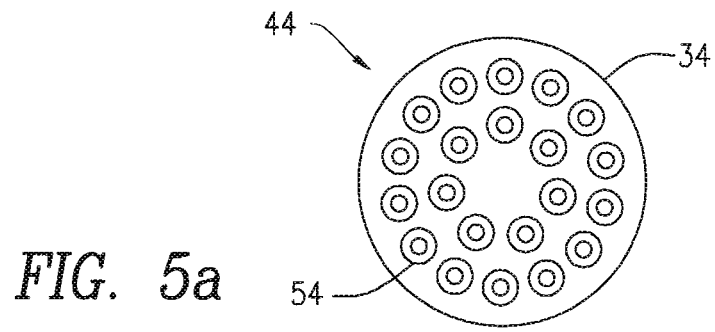
FIG. 5(a) shows a front elevation view of the un-tufted oscillation head of FIG. 4(a)
Figure 5B:
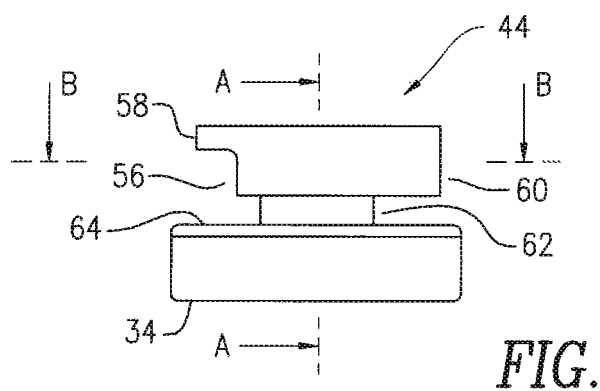
FIG. 5(b) shows an end view (inverted) of the oscillation head of FIG. 5(a)
Figure 5C:
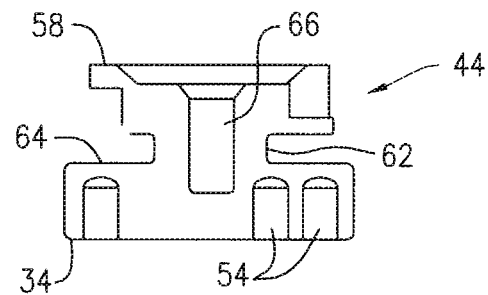
FIG. 5(c) is a view of the oscillation head of FIG. 5(b) along view line A-A.

Referring to FIGS. 5(a) to 5(d), FIG. 5(a) shows a front view of the oscillation head but with no bristle tufting on bristle plate 34. FIG. 5(b) shows an end view of oscillation head 44 with bristle plate 34, the mid-section 56, the configured member 60, mid-section neck or axle 62 and the bottom ring member 58. As more clearly depicted in FIG. 5(c), which is a cut-away view along section line A-A, oscillation head is formed with an opening 66 which extends through bottom member 58 and preferably through configured member 60 and axle 62. Most preferably, opening 66 also extends into the underside 64 of bristle support plate 34. Opening 66 is positioned, sized, and configured so as to enable an engagement or attachment to upper shell head 50 as will be described below so that the bristle head 34 can rotate thereon. Opening 66 is essentially concentric to support plate 34. Where opening 66 extends through axle 62 and into underside 64, it should not impair the structural integrity of support plate 34 or of the tufting openings 54.

Figure 5D:
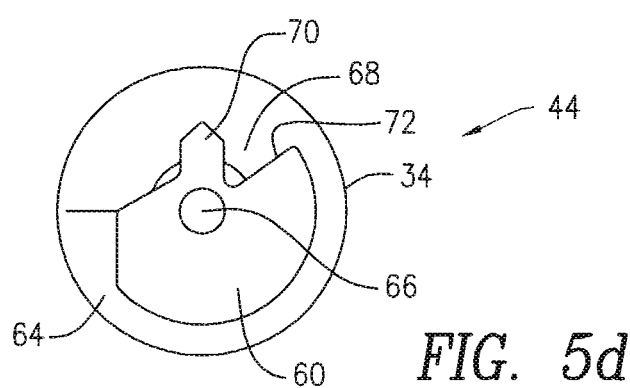
FIG. 5(d) is a view of the oscillation head of FIG. 5(b) along view line B-B.

FIG. 5(d) shows a cut-away view of the oscillation head 44 of FIG. 5(b) along sectional view line B-B. As shown in FIG. 5(d), the contoured member 60 has at least one peripheral cavity 68 defined by at least one shaped tooth 70 and at least one surface 72 as further described below. In alternate embodiments, contoured member 60 may have two or three cavities defined in a like manner.

B. The Translation Head

Figure 6A:
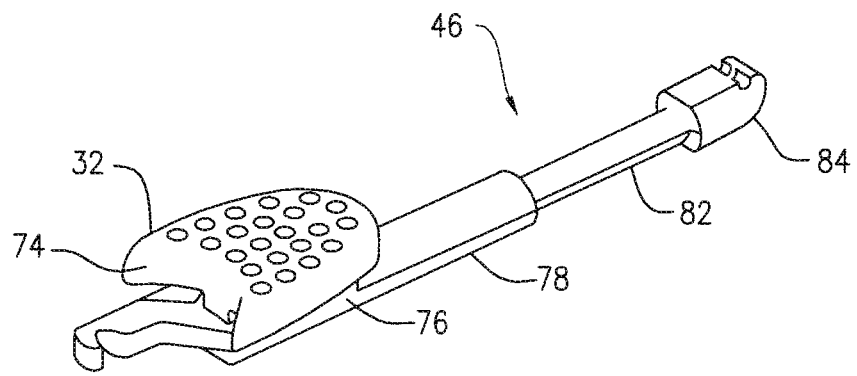
FIG. 6(a) is a perspective view of an untufted translation head of the invention.
Figure 6B:
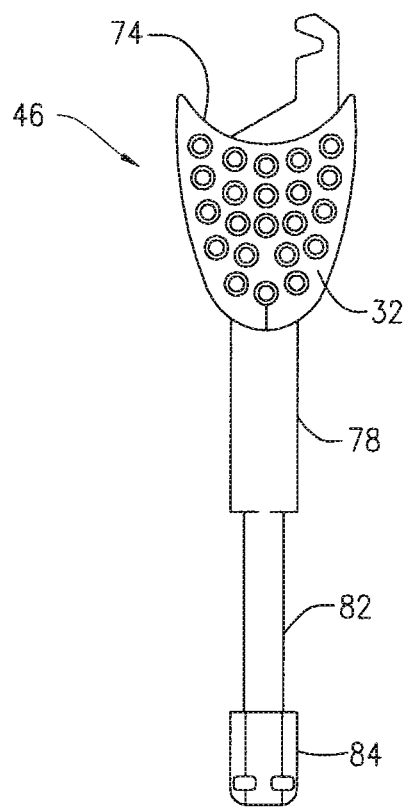
FIG. 6(b) is a front elevation view of the translation head of FIG. 6(a)
Figure 6C:
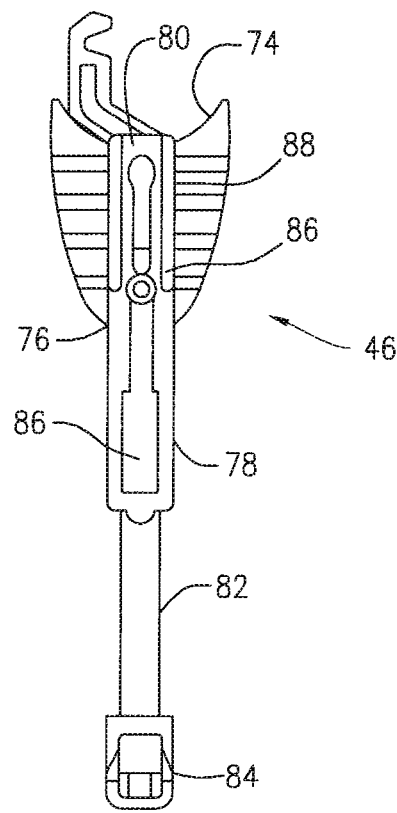
FIG. 6(c) is a rear elevation view of the translation head of FIG. 6(b)
Figure 6D:
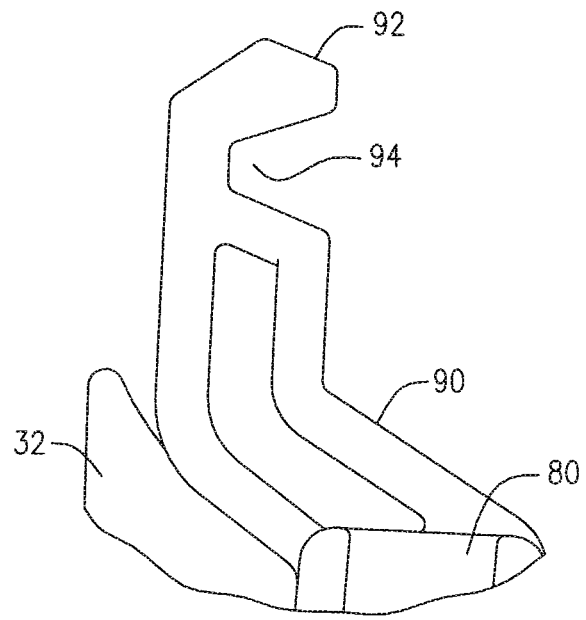
FIG. 6(d) is an enlarged view of an upper section of the translation head of FIGS. 6(a) to (c)

FIG. 6(a) shows in perspective translation head 46 but without the bristle tufts. FIG. 6(b) is a front elevation view of the translation head of FIG. 6(a). FIG. 6(c) is a rear elevation view of the translation head of FIG. 6(b). FIG. 6(d) is an enlarged view of an upper section of the translation head of FIG. 6(c). The translation head or plate 46 of the invention is multi-functional as will be described below including its role as a part of the drive system of brush head section 16.

As seen in FIGS. 1, 6(a), and 6(b), translation head 46 has a first bristle plate or pad section (lower bristle support section) 32 which is elongated elliptical in a front view and has a cradle-like upper boundary 74 to accommodate the bristle plate 34 (second bristle plate or pad support section) of oscillation head 44. The first bristle support plate or pad 32 is part of, or formed as part of, a multi-zone shaft-like structure 76. Shaft-like structure 76 has a lower section 78 which extends below or rearward of the first bristle plate support section toward handle 14. It also has an upper portion 80. Also extending from lower section 78 in the direction of handle 14 is a head connector rod section 82, which terminates in connector piece 84 to engage the handle 14 at forward section 28 thereof.

As best seen in FIG. 6(c), shaft-like structure 76 has a housing or recessed section 86 in lower section 78. Housing or recess 86 is sized and dimensioned to contain an element of the return mechanism arrangement such as spring 52 shown in FIG. 3. The shaft-like structure 76 in the area behind first bristle plate 32 has wear or bearing surfaces 86 and outside alignment edges 88. The latter assist in positioning during assembly.

Referring to FIG. 6(d), extending from upper section 80 is an arm or wedge section 90. Arm or wedge section 90 may be angled as necessary relative to the longitudinal axis 12 (not shown). At or proximate to the uppermost or forward most section of arm or wedge 90 is at least one contoured structure 92. In a preferred embodiment, contoured structure 92 is adjacent to a cut-out area 94. In alternate embodiments, arm or wedge 90 may have two or three contoured structures 92, each of which is optionally adjacent one to three cut-out areas 94.

Contoured structure 92 is adapted for engagement with, and movement within, cavity 68 located on a peripheral portion of the contoured member 60 of oscillation head 44. Cavity 68 is sized, shaped, and positioned on the contoured member 60 such that, in operation, a desired range of contact angle between the contoured structure 92 and the engaged cavity 68 boundaries results in a proper and efficient transmission of power to oscillate the oscillation head 44 and the upper or second bristle support section 34 thereon with minimal or no slippage. In a preferred embodiment, during the rotation, there is predominantly a point to point contact, i.e. a rolling contact in contrast to a sliding contact which would result in a higher degree of friction between the contacting parts. This reduction in friction or sliding contact is obtained by way of the design of the one to three protrusions or contoured structures 92 of the translation head and tight manufacturing tolerances. Simultaneously, the lower or first bristle support section 32 is reciprocated along, or substantially parallel to, the longitudinal axis of the device. When in operation, the angle of rotation of the upper or second bristle head 34 is in the range of about 25° to 40°, preferably in the range of about 28° to 33°, and most preferably in the range of about 29° or 30° to about 32°. An angle of about 30° is most preferable. The contoured structure 92 does not rotate about the longitudinal axis 12 or any axis parallel thereto. The pressure or contact angle of contoured structure 92 and the contact surface or surfaces defining cavity 68 is in the range of about 15° to 25°, preferably about 17° to 23°, and most preferably about 19°, 20°, or 21°.

When there is no reciprocation or oscillation, the cavity 68 of the oscillation head is located in a region above a horizontal plane (FIG. 1) passing through the axis of rotation of the upper bristle head 34 and substantially perpendicular to the longitudinal axis 12 of the device 10. That is to say, when not connected to the handle and when in a new or substantially new condition, if when at rest the upper circular bristle head 34 were considered as a clock face, the cavity or cavities 68 would be in the 12 to 3 or 9 to 12 quadrant on the circular bristle plate. Preferably, cavity 68 is at about 1-2 O'clock in the upper right quadrant or 10 to 11 O'clock in the upper left quadrant. Thus, the invention eliminates any need in the brush head section 16 for an arm and pin construction to transmit motion to the upper bristle head. See, for instance, U.S. Pat. No. 6,178,579 at FIG. 12 thereof.

Preferably, the translation head is of a one piece construction and is of a plastic material, most preferably of a commercially available acetal copolymer. The translation head or plate is preferably made by injection molding.

C. The Lower Head Shell

Figure 7A:
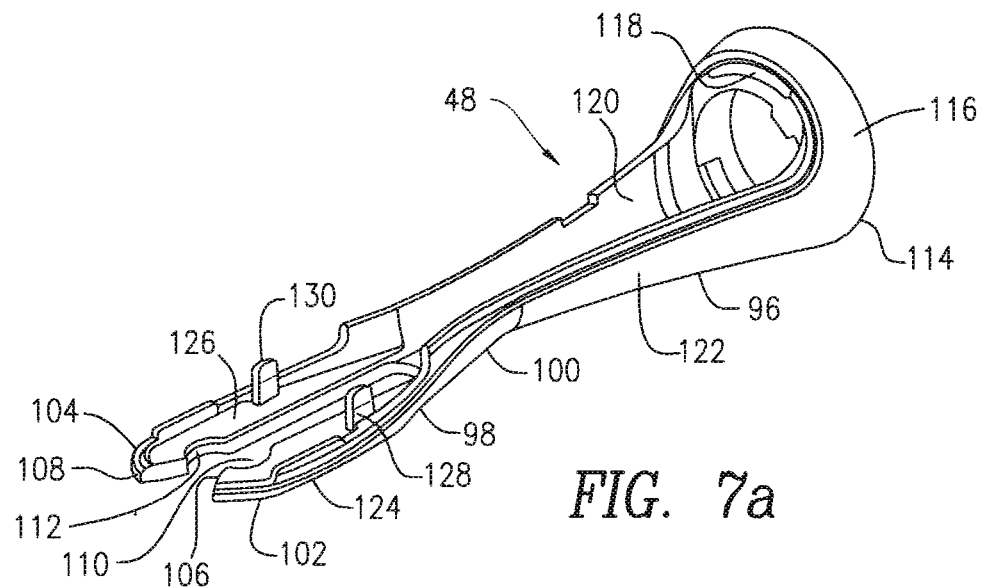
FIG. 7(a) shows, in a perspective view, a lower head shell of the invention.
Figure 7B:
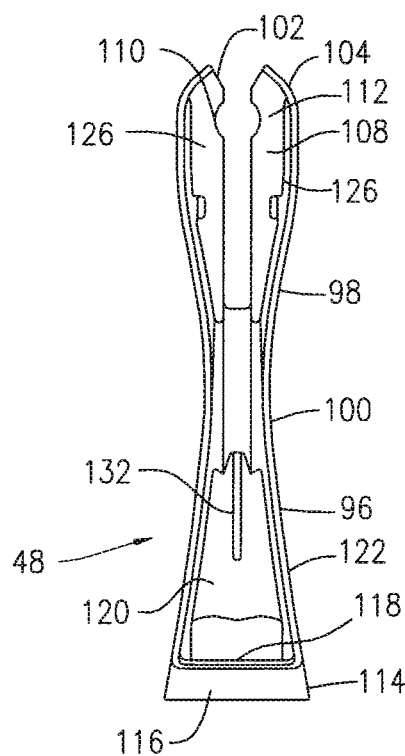
FIG. 7(b) shows a plan view of the lower head shell.

FIG. 7(a) shows, in a perspective view, a preferred embodiment of a lower head shell of the invention. FIG. 7(b) shows the lower head shell in a plan view.

Lower head shell 48 has a rear section 96, a forward section 98 and a connecting neck section 100 extending between the rear and forward sections of the lower head shell. As can be seen in FIG. 7(a), the cross section of lower head shell 48 as viewed along an end changes in geometry along its length from round or substantially round to troughlike to essentially planar along its longitudinal axis from its rear section 96 to its forward section 98.

Rear section 96 is shaped, sized, and configured for engagement to handle 14 at the handle's forward end 28. The lower head shell has at its forward section 98 a pair of arms or prongs 102 and 104, each having a substantially planar surface 106 and 108 respectively. Each of surfaces 106 and 108 is shaped with a cut-out area 119 and 112 respectively.

Rear section 96 has a back end 114 which, in a preferred embodiment, is essentially circular in cross section, but preferably conforms geometrically to the handle 14 forward end 28 to obtain a fitting and secured engagement. Back end 114 narrows in cross section in a forward direction towards forward section 98 and transitions to a trough-like cross section in or near the neck section 100.

The back end 114 has a circumferential wall 116 which in the forward direction defines a partial frustum or frusto-conical like surface. A first forward edge 118 bounds a part of the frustum or frusto-conical like surface and partly defines an open area 120. Open area 120 will be enclosed as discussed below in the assembly of brush head 16.

As shown in FIGS. 7(a) and (b), the open space 120 is partially bound by the wall section 122 which, in a preferred embodiment, transitions the cross section geometry of lower head shell 48 from rounded to, in the forward section 98, planar. That is to say, wall section 122 decreases from back end 114 to the forward section 98. The wall section 122 has an upper edge 124 adapted for engagement to upper head shell 50 as will be discussed below. As shown in FIG. 7(a), the lower head shell has locating ribs 128 and 130 to maintain the position of the arms or prongs. As shown in FIG. 7(b), lower head shell 48 is fashioned with a connecting rib 132, which limits movement of the translation head shaft to maintain connection to the handle.

The arms or prongs 102 and 104 are sized, spaced and arranged to permit translation head 46 to be inserted therein. The translation head is thus supported by the lower head shell such that the lower bristle support section 32 is located on a first side of the prongs 124, while the remainder of the translation head is positioned on the second side of the prongs 126. The oscillation head 44 at its mid-section neck 62 is positioned between the prongs such that the lower periphery of the bristle plate 34 of the oscillation head is proximate to the cradle-like upper boundary 74 of the lower bristle support section 32 of translation head 46. This results in both bristle head-supports 32 and 34 being positioned on the same side of the arms or prongs and the contoured structure 92 and the contoured member 60 of the oscillation head being located on the opposite side of the arms or prongs 102 and 104.

D. The Upper Head Shell

Figure 8:
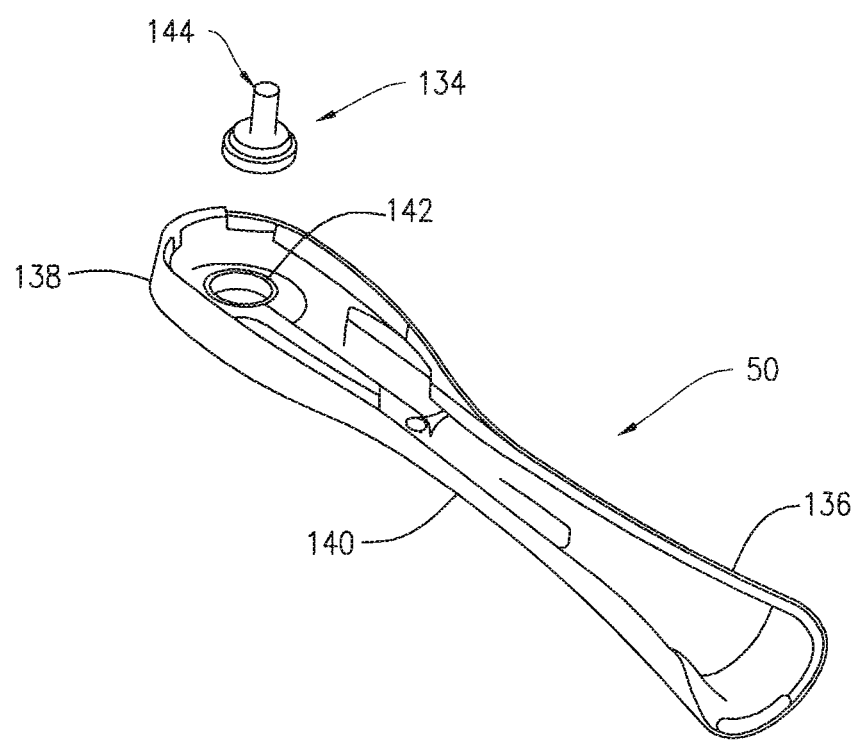
FIG. 8 shows an upper head shell of the invention.

FIG. 8 shows an upper head shell 50 of the invention and pin 134. The upper head shell 50 has a rearward area 136 and a forward end 138 with an intermediate section 140 therebetween. Upper head shell 50 is preferably fashioned so that it will have a complimentary fit with the lower head shell 48. The forward end 138 of upper head shell 50 is shaped and dimensioned to conform to the contour outline of the corresponding end of the lower head shell and receive and contain that portion of the translation head on the side of the arms or prongs 102 and 104 opposite to, or behind, the bristle support plates 32 and 34. The forward end 138 also houses bearing pin 134 secured to, or formed as part of, the inner surface of the head. As shown in FIG. 8, the bearing pin 134 may be either insert molded or may be separate and inserted into a preformed opening 142 located in the forward end. Bearing pin is positioned such that when in an assembled condition with the oscillation head 44, its shaft 144 extends into opening 66 of mid-section 56 of the oscillation head.

E. The Spring

In the invention, the return mechanism can be a spring system and is preferably a single spring system 52 (FIG. 3). The return mechanism or spring is meant to ensure a connection is achieved reliably between the head and handle. Because it's impossible to predict where the handle and the head shafts have last stopped, there needs to be a method of ensuring the connection features always meet. Thus the spring or return mechanism forces the head shaft to the bottom to assist with achieving this connection.

In operation, the translation head or plate 46 is reciprocated along, or substantially parallel to, the longitudinal axis 12 of the device 10. The motion causes the lower bristle support or lower head 32 and the contoured end 92 of the wedge or angled extending arm 90 to reciprocate. Due to the engagement of the contoured end and the contoured member 60 as described above, the oscillation head 44 and the upper bristle plate 34 thereon rotate through a specific angle and counter rotate coincidentally with the translation head's return stroke. While the translation head or plate is in motion within the brush head, brush head section 16 as a unit is relatively stationary relative to handle 14.

The present invention also is in a method of assembly. In a preferred embodiment, the method comprises providing an oscillation head having a contoured member with at least one peripheral cavity defined by at least one shaped tooth and at least one surface and a bristle support plate, and also providing a translation head having a bristle support plate and an arm extending beyond the bristle support plate of the translation head, the arm having at least one contoured structure. The oscillation head and the translation head are engaged to form a first sub-assembly which is positioned in a first section of a lower head shell to form a second sub-assembly. A return mechanism is positioned within, or in connection with, the translation head to form a third sub-assembly. An upper head shell is contacted with the lower head shell so as to at least partially enclose the third sub-assembly. In the method of the invention, the oscillation head is optionally secured to the upper head shell as part of, or prior to, or subsequent to, the forming of either the second or third sub-assembly. The partially or fully assembled brush head section can be attached to an at least a partially assembled handle section. Preferably, the bristle support plates are pre-tufted. The method of assembly may be adapted to be completely or partially computerized and/or automated.

The terms and expressions which have been employed are used as terms of description and not of limitation and there is no intention in the use of such terms and expressions of excluding any equivalents of the features shown and described or portions thereof, it being recognized that various modifications are possible within the scope of the invention.

What is claimed is:

1. A dual action electric toothbrush comprising:
    an elongated body portion with opposed first and second ends and a longitudinal axis extending between the first and second ends;
    a brush head section disposed at the first end and comprising:
        a first bristle support pad comprising a first bristle support member with one or more bristle tufts thereon and a second bristle support pad comprising a second bristle support member with one or more bristle tufts thereon;
        a translation head comprising a rod or support member having an axis oriented so as to extend coincident with or substantially parallel to the longitudinal axis of the electric toothbrush and the rod or support member being integrally formed with the first bristle support pad, said rod or support member having a first lower end and an upper boundary and a lower boundary spaced from the first lower end, wherein the rod or support member is arranged to directly cause longitudinal non-rotary reciprocating rectilinear motion of the integrally formed first bristle support member;
        an oscillation head having disposed thereon the second bristle support member and comprising a mid-section defining a cavity arranged on a peripheral portion of the mid-section;
        a translation head member formed on the first bristle support pad and extending above the upper boundary, the translation head member having an upper end for engagement with the cavity of the oscillation head so as to induce a different motion of the second bristle support pad; and
    a handle disposed at the second end and having a motor contained therein and adapted for engagement to the brush head section.

2. The electric toothbrush according to claim 1 wherein the translation head member comprises a protrusion having a single contoured structure and the different motion of the second bristle support pad is rotary or oscillatory motion.

3. The electric toothbrush according to claim 1 wherein the translation head is of a unitary construction.

4. The electric toothbrush according to claim 1 wherein the translation head is of a one piece construction.

5. The electric toothbrush according to claim 2 wherein the translation head is of a one piece molded construction.

6. The electric toothbrush according to claim 2 wherein the translation head is of a one piece molded construction of an acetal copolymer.

7. The electric toothbrush according to claim 1 wherein the brush head section further comprises:
    (a) an upper head shell;
    (b) a lower head shell;

and (c) a return element or spring.

8. The electric toothbrush according to claim 1 wherein the first bristle support member is disposed on the translation head.

9. The electric toothbrush according to claim 7 wherein the upper head shell has, extending from a lower surface thereof, a bearing pin and the oscillation head is positioned on the bearing pin.

10. The electric toothbrush according to claim 9 wherein the bearing pin is of a metal material.

11. The electric toothbrush according to claim 1 further comprising a battery within the handle to power the motor.

12. The electric toothbrush according to claim 7 wherein the lower head shell is contoured for a fitting engagement with the upper head shell.

13. The electric toothbrush according to claim 7 wherein the lower head shell has a pronged end.

14. The electric toothbrush according to claim 13 wherein the pronged end is formed with two prongs which define an elongated opening coincident with, or substantially parallel to, the longitudinal axis of the toothbrush and which receives and supports the translation head for reciprocating movement therein.

15. The electric toothbrush according to claim 14 wherein the second bristle support member has an underside and the oscillation head further comprises a bottom piece attached to, or formed as part of, the oscillation head, the bottom piece being positioned concentric to the second bristle support member and spaced from the underside to define a space there-between.

16. The electric toothbrush according to claim 15 wherein the cavity is shaped and sized so as to receive the contoured upper end at a desired contact angle so as to cause the oscillation head to have rotary oscillating motion while the first bristle support member moves in a longitudinal non-rotary reciprocating rectilinear motion.

17. The electric toothbrush according to claim 16 wherein the first bristle support member has a rear surface which is spaced from the rod or support member of the translation head defining a space there-between, the space being sized and configured so as to engage the prongs of the lower head shell.

18. The electric toothbrush according to claim 17 wherein the bottom piece has a hole to receive the bearing pin of the upper head shell.

19. A translation head for a dual action electric toothbrush having a handle and brush head section and a longitudinal axis there-between, the translation head comprising a rod or support member having an axis oriented so as to extend coincident with or substantially parallel to the longitudinal axis of the electric toothbrush, the rod or support member having a first lower end; a first bristle support pad integrally formed as a part of the rod or support member, the first bristle support pad having an upper boundary and a lower boundary spaced from the first lower end, wherein the rod or support member is arranged to directly cause longitudinal non-rotary reciprocating rectilinear motion of the integrally formed first bristle support member; and a translation head member formed on the first bristle support pad and extending above the upper boundary, the translation head member having an upper end for engagement with a cavity arranged on a peripheral portion of a mid-section of an oscillation head so as to induce a different motion of a second bristle support pad disposed on the oscillation head.

20. The electric toothbrush according to claim 1 wherein the translation head member comprises a translation head arm and the different motion of the second bristle support pad is rotary or oscillatory motion.

\* \* \* \* \*